United States Patent [19]

Anthony

[11] Patent Number: 4,650,643

[45] Date of Patent: Mar. 17, 1987

[54] NEUTRON STREAMING SHIELD FOR NUCLEAR VESSEL CAVITY

[75] Inventor: Andrew J. Anthony, Tariffville, Conn.

[73] Assignee: Combustion Engineering, Inc., Windsor, Conn.

[21] Appl. No.: 723,706

[22] Filed: Apr. 15, 1985

Related U.S. Application Data

[63] Continuation of Ser. No. 440,785, Nov. 10, 1982, abandoned.

[51] Int. Cl.[4] .................... G21C 11/00; G21F 3/02
[52] U.S. Cl. .................................. 376/288; 376/287; 376/339; 250/518.1
[58] Field of Search ..................... 376/287–290, 376/339; 250/515.1, 518.1

[56] References Cited

U.S. PATENT DOCUMENTS

| | | | |
|---|---|---|---|
| 2,853,624 | 9/1958 | Wigner et al. | 250/515.1 |
| 2,977,297 | 3/1961 | Evans et al. | 376/287 X |
| 3,257,285 | 6/1966 | Clifford et al. | 376/287 X |
| 3,265,898 | 8/1966 | Lehmer | 376/287 X |
| 3,857,442 | 12/1974 | Sturiale et al. | 376/287 X |
| 3,994,776 | 11/1976 | Keller | 376/289 |
| 4,090,087 | 5/1978 | Weissenfluh | 376/287 X |
| 4,123,662 | 10/1978 | Fisher | 376/287 X |
| 4,126,515 | 11/1978 | Klotz et al. | 376/287 |
| 4,298,431 | 11/1981 | Depierre et al. | 376/290 |
| 4,360,736 | 11/1982 | Weissenfluh | 376/287 X |

OTHER PUBLICATIONS

Permali's Shield Collar, Advertisement, Nov. 82.
Type 277 Heat Resistant Shielding, Reactor Experiments Inc., Nov. 1982.

Primary Examiner—David H. Brown
Assistant Examiner—Dan Wasil
Attorney, Agent, or Firm—John H. Mulholland

[57] ABSTRACT

A neutron streaming shield comprising a plurality of wire mesh baskets, each basket located between two adjacent vessel nozzles, the total area of the nozzles and baskets being sufficient to intercept any streaming neutrons. The baskets are substantially filled with a multiplicity of randomly packed lumps of a neutron attenuating material, preferably a borated-hydrogenated-argillaceous media. Since the basket is somewhat flexible, it can be inserted in the annulus above the nozzles and then filled with the lumped material, forming a plurality of barriers to compliment the attenuating affect of the nozzles, such that any streaming neutrons will be stopped either by the nozzles or the lumped material in the baskets.

12 Claims, 5 Drawing Figures

4,650,643

NEUTRON STREAMING SHIELD FOR NUCLEAR VESSEL CAVITY

This is a continuation of co-pending application Ser. No. 440,785 filed on Nov. 10, 1982 now abandoned.

BACKGROUND OF THE INVENTION

This invention relates to nuclear power plants and in particular to shielding for the nuclear reactor vessel.

In a typical commercial nuclear power plant, a reactor vessel containing the nuclear core is located within a large concrete cavity. Because access for most of the maintenance and refueling operations for the reactor must be from above the vessel, the cavity walls provide shielding only below and laterally of the vessel. Since under all normal operating conditions a substantial amount of water covers the reactor core, additional shielding is not required directly above the core.

There exists, however, a path by which neutrons originating from the reactor core can escape the concrete and water shielding and thereby pose a danger to operators and equipment located above the reactor vessel. This neutron leakage, often called neutron streaming, results from the scattering of neutrons as they emerge from the sides of the reactor core and collide with non-absorbing structures. Such collision paths produce neutrons travelling vertically along the outside of the reactor vessel in the annular space between the vessel and the surrounding cavity wall.

Various techniques have been employed to attenuate and absorb streaming neutrons. For example, one technique seals the annular space between the upper portion of the vessel and the opposite wall with neutron attenuating material cut into large, flat pieces that are fit into the space as pieces would be fit into a jigsaw puzzle. Another type of cavity streaming shield utilizes water bags or water tubs. The water bags have been troublesome because they are subject to irradiation induced deterioration which results in leaking or plugging of their drains. Steel tubs filled with water, like the water bags, require removal and reinstallation during a refueling outage so that the reactor vessel pool seal may be installed temporarily. This critical-path operation not only consumes time, but also increases the radiation exposure of personnel.

Such prior art techniques also have deficiencies associated with the consequences of an hypothesized loss of coolant accident, whereby a primary nozzle or pipe break injects high temperature, high pressure steam into the space between the vessel and the cavity wall. The techniques which effectively seal the space above the nozzles with the shielding material render the annular space a sealed chamber in which extremely high pressures can build up and produce imbalanced loads on the reactor vessel. Also, as the pressure builds up to a threshold value, the shield will finally blow off and send shield fragments rocketing into the containment building where additional damage may be done.

Another major disadvantage is that the prior-art shields, by sealing off the annulus, prevent satisfactory heat dissipation from the external surfaces of the reactor vessel. If the prior art techniques were to leave spaces or openings to allow the free flow of heated air up the annulus (or to minimize pressure peaks in the event of an accident), they would also allow some unwanted streaming of neutrons through the shield.

SUMMARY OF THE INVENTION

The present invention overcomes the problems associated with the prior art techniques, by providing a neutron streaming shield comprising a plurality of mesh baskets, each basket located between two adjacent vessel nozzles, the total area of the nozzles and baskets being sufficient to intercept any streaming neutrons. The baskets are substantially filled with a multiplicity of randomly packed lumps of a neutron attenuating material, preferably a borated-hydrogenated-argillaceous media. Since the basket is somewhat flexible, it can be inserted in the annulus above the nozzles and then filled with the lumped material, forming a plurality of barriers to compliment the attenuating effect of the nozzles, such that any streaming neutrons will be stopped either by the nozzles or the lumped material in the baskets.

Preferably, the baskets are designed to conform to one or both of the reactor vessel nozzles and cavity wall, either abutting or spaced therefrom, to optimize the pressure relief and temperature control requirements while still providing satisfactory neutron attenuation.

Significant pressure buildup in the annular region external to the reactor vessel is limited because spaces between the baskets and the surrounding structure can be provided, and many of the lumps adjacent to an hypothesized accident location will be blown out. Because of the small size and low mass, the ejected lumps will not become destructive missles, but most likely will fracture on impact.

The present invention provides a shield design that is simple, low cost, and readily installed in existing plants. It does not have to be removed during refueling and therefore remains off the critical time path and helps reduce the exposure of personnel. It can, however, be readily removed if necessary or if desired. An additional advantage is that the shield is free from difficult seismic problems that arise with the larger, more rigid prior art shields.

BRIEF DESCRIPTION OF THE DRAWINGS

These and other advantages of the present invention will become apparent from the description of the preferred embodiment and the accompanying drawings, in which.

DESCRIPTION OF THE PREFERRED EMBODIMENT

Figure 1:
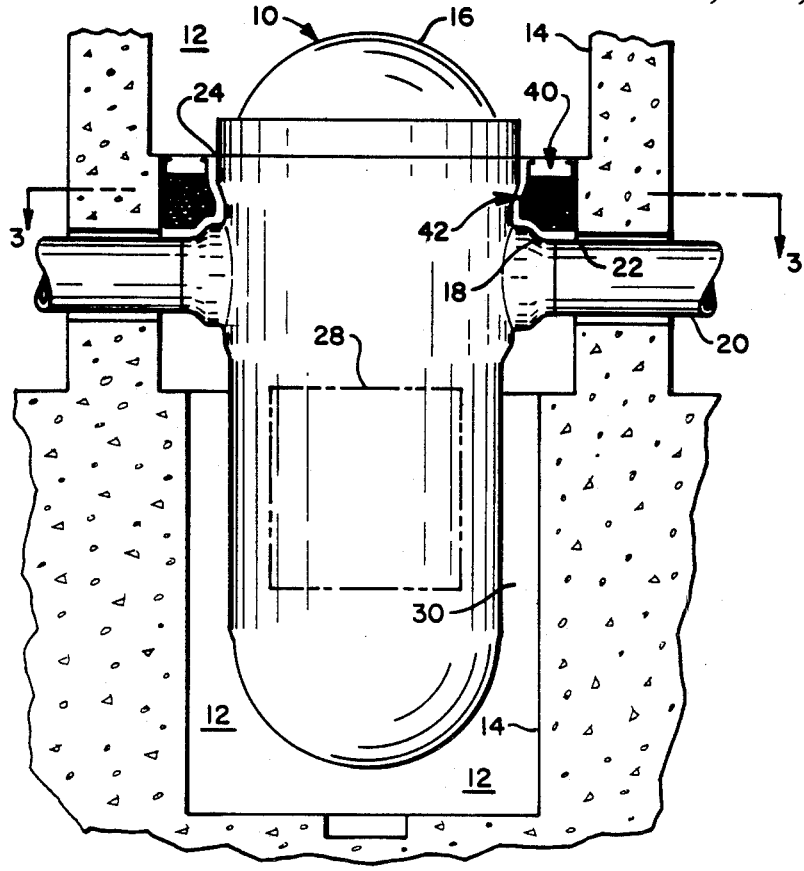
FIG. 1 is a schematic view of a nuclear reactor vessel located within its cavity, showing the general location of the inventive neutron streaming shield.

FIG. 1 is a schematic view of a nuclear reactor vessel 10 located within a cavity 12 formed by cavity walls 14 which surround the vessel below and laterally thereof. The vessel 10 has a closure head 16 attached thereto and coolant nozzles 18 for carrying coolant into and out of the vessel. For purposes of the present description, the vessel nozzles 18 include the piping 20 welded thereto up to the point 22 where the nozzle or piping penetrates the cavity wall 14.

Figure 4:
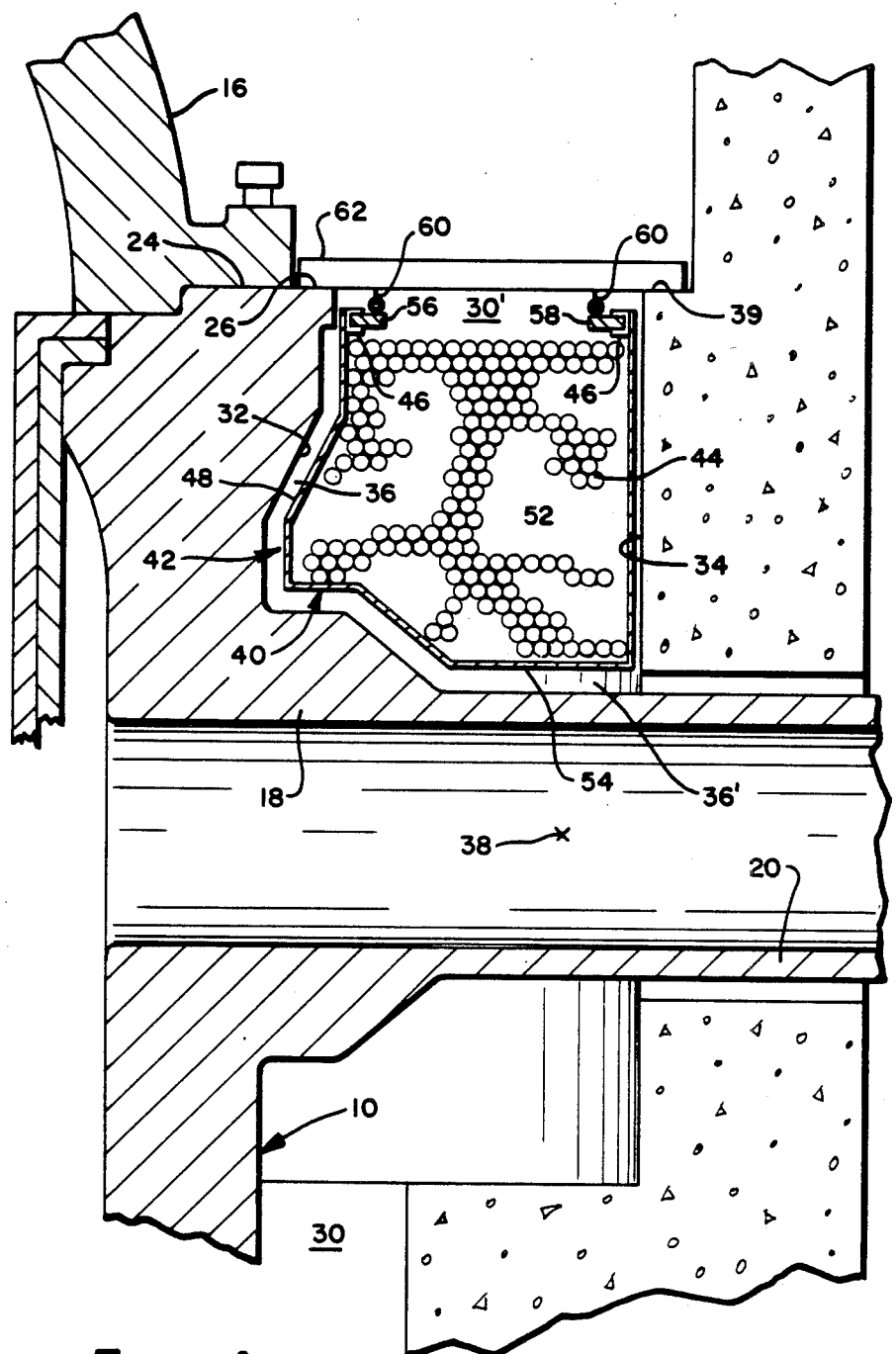
FIG. 4 is a schematic cross section taken along line 4—4 of FIG. 3.

The present invention is shown generally in FIGS. 1 and 4 as a neutron streaming shield 40 located around the vessel 10 at an elevation generally between the nozzles 18 and the top of the vessel 24, which typically includes a vessel flange or lip 26. The purpose of the shield is to attenuate and absorb neutrons that have leaked from the reactor core 28, (shown in phantom), up through the annular area 30 between the vessel 10 and cavity walls 14. Typically these neutrons emerge from the sides of the reactor core, make their way through the moderating reflector (not shown) and vessel walls, by which time their direction has become random such that a significant number are moving upwardly through the open annular space. Since the area directly above the cavity 12 is not shielded with concrete and a number of refueling and maintenance functions must be performed from above the reactor vessel, adequate shielding for personnel must be provided. During refueling, for example, neutrons that have leaked from the top of the core must travel through a considerable depth of water between the core and the top of the vessel, and are accordingly attenuated. The present invention concerns the neutrons that have penetrated the vessel and are moving upwardly outside the vessel.

The present shield 40 includes a plurality of wire mesh baskets 42 located in the portion of the annulus 30' between the vessel and the cavity wall in the vicinity of the reactor nozzles 18 and flange 26. The baskets 42 contain a multiplicity of randomly packed lumps 44 of a neutron attenuating material. The baskets are preferably made of flexible stainless steel wire mesh having a profile in section generally conforming to the profile of the reactor vessel in the area between the nozzle and the flange. In the preferred embodiment, the baskets include bracket means 46 fixedly connected to the upper portion of each basket, for ease of inserting and removing the basket or for suspending the basket from support structure 62 associated with the flange and cavity wall.

Figure 3:
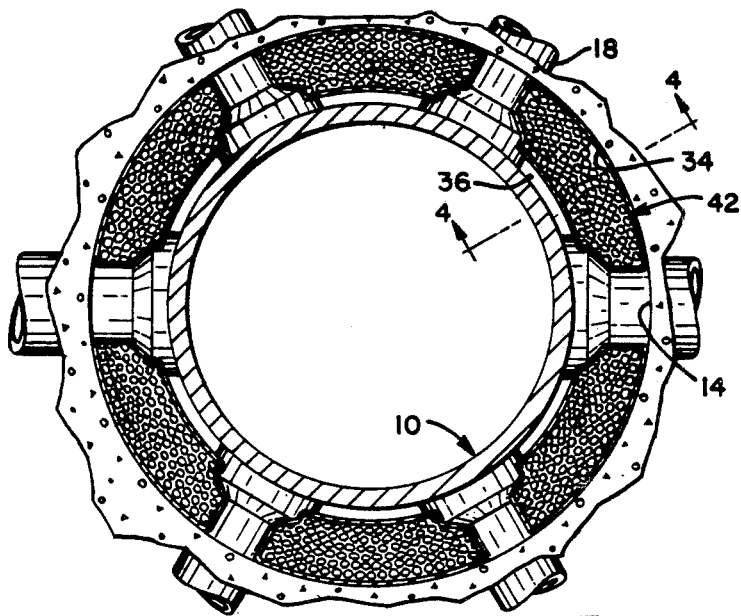
FIG. 3 is a schematic view along line 3—3 of FIG. 1, showing the plurality of baskets located between adjacent nozzles.

FIG. 3 shows the preferred arrangement of baskets around a vessel having six nozzles. Six baskets 42 are provided, each basket located between two adjacent nozzles 18. When viewed from above, the total of all nozzles and baskets occupy at least most, and preferably substantially all the area between the vessel 10 and cavity wall 14 at that elevation.

Figure 2:
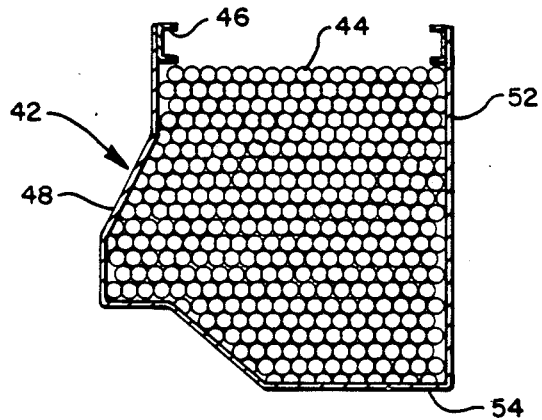
FIG. 2 is a section view of the inventive basket containing the neutron attenuating lumps.

Referring again to FIGS. 2 and 4, the inner profile 48 of the basket generally conforms to the profile 32 of the reactor vessel surface between the nozzles and top of the vessel, and the outer profile 52 of the basket generally conforms to the cavity wall 34 opposite the vessel surface. Preferably, the inner conforming profile 48 of the basket is spaced 36 from the vessel surface 32 and the outer conforming profile 52 abuts the cavity wall 34. The lower portion 54 of the basket may either be adapted to rest on the nozzle surface, or may be separated therefrom as shown at 36' in FIGS. 3 and 4, and the upper portion of the basket is open, or uncovered.

The purpose of the spaces 36,36' is to provide a path of least resistance by which flashing steam from a nozzle or pipe rupture at, for example, location 38 shown in FIG. 4, may escape from the annulus 30,30' without producing inbalanced loads on the vessel. Furthermore, the space 36 permits heat generated during normal operation or during shutdown modes, from building up in the annulus 30 by flowing upward through the openings 36 between the baskets and the vessel. As illustrated in FIG. 4, the flexibility of each basket 42 enables ready insertion into the area 30' between the vessel and the cavity wall such that streaming neutrons are intercepted along any vertical line of sight from the lower portion of the reactor vessel annulus 30, yet a heat and pressure dissipation path is still provided.

As previously indicated, the baskets 42 can merely be placed upon adjacent nozzles 18, in which case no other support structure would be required. This has the advantage, that a typical prior art refueling cavity seal (not shown) can be located between the vessel flange 26 and cavity wall ledge 39, enabling the portion of the cavity above the flange to be filled with water as a first step in the refueling process. The streaming shield baskets 42 need not be removed, as was required in prior art streaming shields, in order to secure the cavity seal in place. The brackets 46 are nevertheless desirable in the event the baskets 42 are to be removed for whatever reason.

Figure 5:
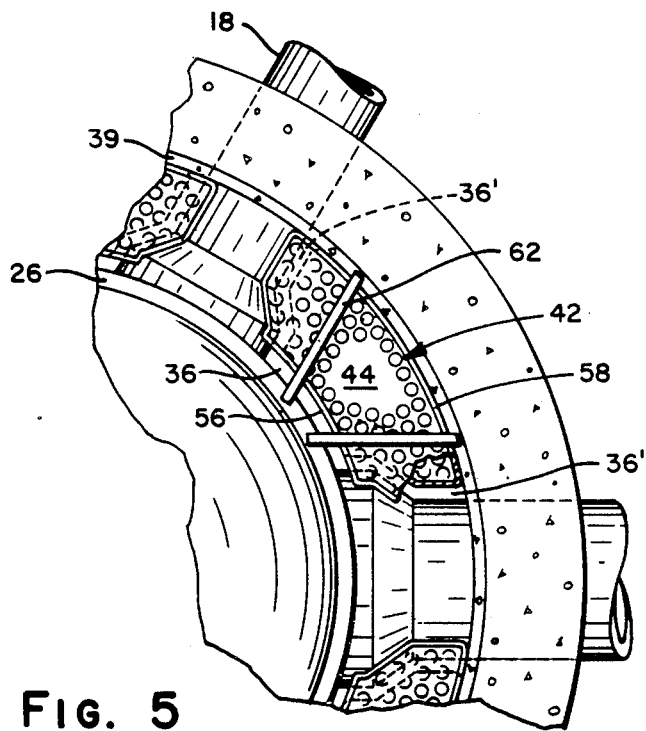
FIG. 5 is a schematic plan view showing a portion of the structures for suspending the basket from the reactor vessel flange and cavity wall.

Alternatively, as shown in FIGS. 4 and 5 the vessel flange 26 and the ledge 39 may be used to suspend the baskets by inner 56 and outer 58 bracing means, which are in turn connected at 60 to strut means 62 supported by the cavity wall and flange, preferably by two struts per basket.

The neutron attenuating lumps 44 are preferably made of Type 277 shielding material manufactured by Reactor Experiments, Inc. of San Carlos, Calif. The material is heat resistant, borated, hydrogenated, and can operate continuously at 350° F. It maintains its structural integrity up to 2000° F. The density is about 60% higher than water. The lumps are preferably spherical and may range in size from about one half inch to about two inches in diameter. The depth within the baskets 42 is determined by the shielding requirements, but typically is in the range of 24 to 30 inches. Other materials, such as Type 236 boro-silicone shielding, available from the same company, are also suitable. The above materials have a range of hydrogen content of about $3.3-3.9 \times 10^{22}$ atoms per cc and a boron content in the range of about 1.0 to $1.5 \times 10^{21}$ atoms per cc. The macroscopic thermal neutron cross-section ranges from about 0.7 to about 1.1 cm$^{-1}$, with an overall density of about 1.7 grams per cc. The compressive strength ranges from about 5.50 psi to about 1500 psi, and the tensile strength ranges from about 59 psi to about 100 psi.

The desirable characteristics of these and equivalent materials include not only a high hydrogen content and preferably boron content, for attenuating neutrons, but also small size and relatively low mass. This permits the baskets to absorb a great deal of any energy that may be released during a nozzle break as previously described, with the absorbed energy ejecting lumps into the cavity such that pressure in the annulus 30 is relieved. Because of the small size and low mass of the lumps, they will not become destructive missiles but most likely will fracture on impact. In the preferred embodiment, each basket could be tethered to an adjacent basket to help retain some shielding around the entire annulus following such an accident.

I claim:

1. A neutron streaming shield for a nuclear power plant having a nuclear reactor vessel within a reactor cavity defined by a cavity wall, the vessel including a plurality of coolant nozzles above the reactor core and extending outwardly from the vessel to penetrate the cavity wall, comprising in combination:

a plurality of mesh baskets, each basket located on or between two adjacent nozzles, the total of said nozzles and baskets occupying at least most of the area between the vessel and cavity wall when viewed from above;

a multiplicity of randomly packed lumps of dry neutron-attenuating material substantially filling each basket;

whereby neutrons originating from the reactor core and streaming up through the annulus between the vessel and the cavity wall are attenuated by the nozzles and the lumps of material; and said baskets having uncovered top portions and said lumps being of a size and density such that at least some of the lump can be ejected from the baskets in the event of a rapid pressurization of said annulus.

2. The streaming shield as recited in claim 1 wherein said baskets have an inner profile generally conforming to the profile of the reactor vessel surface between the nozzles and top of the vessel, and an outer profile generally conforming to the cavity wall opposite said vessel surface.

3. The streaming shield as recited in claim 1 further including tether means for flexiby connecting each basket to at least one other basket.

4. The streaming shield as recited in claim 1 further including support means connected to each basket for removeably suspending each basket at the elevation between the nozzles and the top of the vessel.

5. The streaming shield as recited in claim 1 wherein the lump material has a hydrogen density at least that of water.

6. The streaming shield of claim 2 wherein the inner conforming profile of said baskets is spaced from the vessel surface and the outer conforming profile abuts the cavity wall.

7. The streaming shield as recited in claim 4 wherein said support means include, bracket means fixedly connected to the upper portion of each basket, strut means supported by the cavity wall opposite the top of the vessel, and bracing means joining the strut means to the bracket means, whereby the baskets are suspended between the vessel and the cavity wall.

8. The streaming shield as recited in claim 5 wherein said lumps are generally spherical.

9. The streaming shield of claim 8 wherein the lump material has a hydrogen content in the range of about $3.3-3.9\times 10^{22}$ atoms per cc and a boron content in the range of about $1.0-1.5\times 10^{21}$ atom per cc.

10. The streaming shield of claim 5 wherein the thermal neutron macroscopic cross section is in the range of about $0.7-1.1$ cm$^{-1}$.

11. In a nuclear power plant having a reactor vessel including a reactor core, a plurality of nozzles above the core, and a flange surrounding the top of the vessel, said vessel being located within a cavity defined by cavity walls, whereby a generally annular space exists between the vessel and the wall except where said nozzles penetrate the wall, a neutron streaming shield located between the nozzles and the flange, comprising:

a plurality of wire mesh baskets located on or between the nozzles, each basket having an inner profile generally conforming to but slightly spaced apart from the oppositely facing vessel surface, and having an outer surface generally conforming to and abutting the oppositely facing portion of the cavity wall;

a multiplicity of generally spherical, randomly packed lumps of dry neutron-attenuating material substantially filling the baskets;

means for removeably suspending the baskets from the flange and cavity wall, including strut, means cooperating with the flange and cavity walls for engaging said baskets, whereby neutrons originating in the core and streaming upward through said annulus will be attenuated by the material in the baskets and the nozzles.

12. The streaming shield of claim 11 wherein the lump material has a macroscopic thermal neutron cross section in the range of about 0.7 to 1.1 cm$^{-1}$ and an overall density of about 1.7 grams/cc.

* * * * *

UNITED STATES PATENT AND TRADEMARK OFFICE
CERTIFICATE OF CORRECTION

PATENT NO. : 4,650,643
DATED : March 17, 1987
INVENTOR(S) : Andrew J. Anthony

It is certified that error appears in the above—identified patent and that said Letters Patent is hereby corrected as shown below:

Column 4, line 1 of Claim 1, delete "A neutron shield for" and substitute therefor --In-- .

Column 5, line 6 of Claim 1, before "comprising" insert --a neutron streaming shield-- .

Column 5, line 8 of Claim 1, after "total" insert --cross-sectional area-- .

Column 6, line 9 of Claim 11, cancel "on or" .

Column 6, line 10 of Claim 11, before "each" insert --said baskets having uncovered top portions,-- .

Signed and Sealed this

Seventeenth Day of November, 1987

*Attest:*

DONALD J. QUIGG

*Attesting Officer*  *Commissioner of Patents and Trademarks*